United States Patent
Ernst

(10) Patent No.: US 9,656,175 B1
(45) Date of Patent: *May 23, 2017

(54) SYSTEM AND METHOD FOR PROVIDING IN-GAME PRICING RELATIVE TO PLAYER STATISTICS

(71) Applicant: KABAM, INC., San Francisco, CA (US)

(72) Inventor: Tim Ernst, Millbrae, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,634

(22) Filed: Aug. 19, 2015

Related U.S. Application Data

(63) Continuation of application No. 13/910,037, filed on Jun. 4, 2013, now Pat. No. 9,138,639.

(51) Int. Cl.
  *A63F 9/24* (2006.01)
  *A63F 13/792* (2014.01)

(52) U.S. Cl.
  CPC .................. *A63F 13/792* (2014.09)

(58) Field of Classification Search
  CPC .................. A63F 13/792; A63F 2300/575
  See application file for complete search history.

(56) References Cited

U.S. PATENT DOCUMENTS

| | | |
|---|---|---|
| 5,933,813 A | 8/1999 | Teicher |
| 5,964,660 A | 10/1999 | James |
| 6,850,900 B1 | 2/2005 | Hare |
| 6,928,474 B2 | 8/2005 | Venkatesan |
| 7,076,453 B2 | 7/2006 | Jammes |
| 7,533,336 B2 | 5/2009 | Jaffe |
| 7,660,740 B2 | 2/2010 | Boone |
| 7,682,239 B2 | 3/2010 | Friedman |
| 8,016,668 B2 | 9/2011 | Hardy |
| 8,050,976 B2 | 11/2011 | Staib |
| 8,157,635 B2 | 4/2012 | Hardy |
| 8,187,101 B2 | 5/2012 | Herrmann |
| 8,226,472 B2 | 7/2012 | Van Luchene |
| 8,272,956 B2 | 9/2012 | Kelly |
| 8,282,491 B2 | 10/2012 | Auterio |
| 8,287,383 B1 | 10/2012 | Etter |
| 8,287,384 B2 | 10/2012 | Auterio |
| 8,292,743 B1 | 10/2012 | Etter |
| 8,332,260 B1 | 12/2012 | Mysen |
| 8,348,767 B2 | 1/2013 | Mahajan |

(Continued)

OTHER PUBLICATIONS

"Behavioural Analytics & Campaigning", http://lotaris.com/behavioural._analytics_and._Campaigning.htm, screenshot access date May 24, 2012 2:21 PM, 1 page.

(Continued)

*Primary Examiner* — Steve Rowland
(74) *Attorney, Agent, or Firm* — Sheppard Mullin Richter & Hampton LLP

(57) ABSTRACT

One aspect of the disclosure relates to providing players pricing of in-game virtual items associated with their experience and their progress in the game. For example, the first player and the second player may have similar triggers, similar in-game events, and actually have different prices and currencies inside each story depending on each player's progress in the game, thus creating an individualized experience that may alter from player to player.

15 Claims, 4 Drawing Sheets

(56) References Cited

U.S. PATENT DOCUMENTS

| | | | |
|---|---|---|---|
| 8,360,858 B2 | 1/2013 | LaRocca | |
| 8,360,867 B2 | 1/2013 | VanLuchene | |
| 8,366,544 B2 | 2/2013 | Walker | |
| 8,401,913 B2 | 3/2013 | Alivandi | |
| 8,777,754 B1 | 7/2014 | Santini | |
| 8,920,243 B1 | 12/2014 | Curtis | |
| 9,138,639 B1 | 9/2015 | Ernst | |
| 9,345,974 B1 | 5/2016 | Santini | |
| 2002/0059397 A1 | 5/2002 | Feola | |
| 2002/0095327 A1 | 7/2002 | Zumel | |
| 2003/0032476 A1 | 2/2003 | Walker | |
| 2003/0102625 A1 | 6/2003 | Katz | |
| 2004/0068451 A1 | 4/2004 | Lenk | |
| 2004/0215524 A1 | 10/2004 | Parkyn | |
| 2004/0267611 A1 | 12/2004 | Hoerenz | |
| 2005/0114223 A1 | 5/2005 | Schneider | |
| 2005/0165686 A1 | 7/2005 | Zack | |
| 2006/0200370 A1 | 9/2006 | Ratliff | |
| 2008/0032787 A1 | 2/2008 | Low | |
| 2008/0154798 A1 | 6/2008 | Valz | |
| 2008/0234043 A1 | 9/2008 | McCaskey | |
| 2008/0275786 A1 | 11/2008 | Gluck | |
| 2009/0011812 A1 | 1/2009 | Katz | |
| 2009/0017886 A1 | 1/2009 | McGucken | |
| 2009/0204907 A1 | 8/2009 | Finn | |
| 2009/0210301 A1 | 8/2009 | Porter | |
| 2009/0234710 A1 | 9/2009 | Belgaied Hassine | |
| 2009/0247282 A1* | 10/2009 | Cheng | A63F 13/12 463/25 |
| 2010/0035689 A1 | 2/2010 | Altshuler | |
| 2010/0050088 A1 | 2/2010 | Neustaedter | |
| 2010/0094841 A1 | 4/2010 | Bardwil | |
| 2010/0174593 A1 | 7/2010 | Cao | |
| 2010/0198653 A1 | 8/2010 | Bromenshenkel | |
| 2010/0228606 A1 | 9/2010 | Walker | |
| 2010/0241491 A1 | 9/2010 | Eglen | |
| 2010/0241492 A1 | 9/2010 | Eglen | |
| 2011/0092273 A1 | 4/2011 | Cerbini | |
| 2011/0113353 A1 | 5/2011 | Koh | |
| 2011/0145040 A1 | 6/2011 | Zahn | |
| 2011/0300923 A1 | 12/2011 | Van Luchene | |
| 2012/0011002 A1 | 1/2012 | Crowe | |
| 2012/0040743 A1 | 2/2012 | Auterio | |
| 2012/0040761 A1 | 2/2012 | Auterio | |
| 2012/0042282 A1 | 2/2012 | Wong | |
| 2012/0047002 A1 | 2/2012 | Patel | |
| 2012/0059730 A1 | 3/2012 | Jensen | |
| 2012/0101886 A1 | 4/2012 | Subramanian | |
| 2012/0109785 A1 | 5/2012 | Karlsson | |
| 2012/0130856 A1 | 5/2012 | Petri | |
| 2012/0142429 A1 | 6/2012 | Muller | |
| 2012/0166380 A1 | 6/2012 | Sridharan | |
| 2012/0178529 A1 | 7/2012 | Collard | |
| 2012/0197874 A1 | 8/2012 | Zatkin | |
| 2012/0203669 A1 | 8/2012 | Borsch | |
| 2012/0215667 A1 | 8/2012 | Ganz | |
| 2012/0221430 A1 | 8/2012 | Naghmouchi | |
| 2012/0231891 A1 | 9/2012 | Watkins | |
| 2012/0245988 A1 | 9/2012 | Pace | |
| 2012/0289315 A1 | 11/2012 | Van Luchene | |
| 2012/0289330 A1 | 11/2012 | Leydon | |
| 2012/0289346 A1 | 11/2012 | Van Luchene | |
| 2012/0295699 A1 | 11/2012 | Reiche | |
| 2012/0296716 A1 | 11/2012 | Barbeau | |
| 2012/0309504 A1 | 12/2012 | Isozaki | |
| 2012/0330785 A1 | 12/2012 | Hamick | |
| 2013/0005466 A1 | 1/2013 | Mahajan | |
| 2013/0006736 A1 | 1/2013 | Bethke | |
| 2013/0012304 A1 | 1/2013 | Cartwright | |
| 2013/0013459 A1 | 1/2013 | Kerr | |
| 2013/0090173 A1 | 4/2013 | Kislyi | |
| 2013/0124361 A1 | 5/2013 | Bryson | |
| 2013/0226733 A1 | 8/2013 | Evans | |
| 2014/0033262 A1 | 1/2014 | Anders | |
| 2014/0067526 A1 | 3/2014 | Raju | |
| 2014/0067544 A1 | 3/2014 | Klish | |
| 2014/0073420 A1 | 3/2014 | Matthew | |
| 2014/0089048 A1 | 3/2014 | Bruich | |
| 2014/0100020 A1 | 4/2014 | Carroll | |
| 2014/0157314 A1 | 6/2014 | Roberts | |
| 2014/0243072 A1 | 8/2014 | Santini | |
| 2014/0337259 A1 | 11/2014 | Lamb | |
| 2015/0019349 A1 | 1/2015 | Milley | |

OTHER PUBLICATIONS

"Building Structures". War2.warcraft.org. Online. Accessed via the Internet. Accessed Aug. 9, 2014. <URL: http://war2.warcraft.org/strategy/verybasics/building.shtml>, 3 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do >, Apr. 23, 2014, 9 pages.

"Lotro-Wiki.com" (evidence in regards to "Lord of the Rings Oline" MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399577, http://lotro-wiki.com/index.php?title=Quest:A_Little_Extra_Never_Hurts_--.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29 Hamari,Lehdonvirta.pdf, on May 26, 2015, 16 pages.

MMO Site "Rose Online Launches the Newest in Game Feature"; available Aug. 11, 2011 from https://web.archive.org/web/

(56) References Cited

OTHER PUBLICATIONS

20110811231226/http://news.mmosite.com/content/2011-06-21/rose_online_launches_the_newest_in_game_feature.1.shtml, 3 pages.

TFWiki "teamfortress wiki" available Nov. 5, 2011 retrieved from https://web.archive.org/web/20111105044256/http://wiki.teamfortress.com/wiki/Loadout, 4 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online'", available on Sep. 9, 2011, https://web.archive.org/web/20110927210155/http://en.wikipedia.org/wiki/Gaia_Online, 8 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

<http://lotro-wiki.com/index.php?title=Ouest:A_Little_Extra_Never_Hurts_--_Part_2&oldid=399366>, <http://lotrowiki.com/index.php ?title=Getting_Started&oldid=349681 >. Links are to used articles. (7 pgs) Feb. 26, 2014.

"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php?title=LOTRO_Store
&oldid=396550>,<http://lotrowiki.com/index.php?title=Ouest:A_Little_Extra_Never_Hurts_--_Part_1 &oldid=399597> (28 pgs).

Aeria Games GmbH, "First Time Buyer—Aug.", Aug. 10, 2010, <http://grandfantasia.aeriagames.com/news/5600/first-time-buyeraugust> (2 pgs).

\* cited by examiner

SYSTEM AND METHOD FOR PROVIDING IN-GAME PRICING RELATIVE TO PLAYER STATISTICS

FIELD

The disclosure relates to providing in-game pricing relative to player statistics in an online game.

BACKGROUND

Various techniques for providing in-game assets that a player character can obtain within the game are known. In conventional systems questing tends to draw users further and further into a game, keeping rewards fixed without regard for user skill.

SUMMARY

One aspect of the disclosure relates to providing players pricing of in-game virtual items associated with their experience and their progress in the game. For example, the first player and the second player may have similar triggers, similar in-game events, and actually have different prices and currencies depending on each player's progress in the game, thus creating an individualized experience that may alter from player to player.

A system configured to facilitate providing an individualized experience that varies for users in an online game may include one or more processors configured to execute compute program modules. The program modules may comprise one or more of a user module, a space module, an interaction module, a relationship module, a network module, a metrics module, a shop module, a cost determination module and/or any other modules.

A space module may be configured to execute an instance of a virtual space, a space module configured to execute an instance of a virtual space and to implement the instance of the virtual space to facilitate participation by the users in an online game that takes place in the virtual space. The space module may be configured to facilitate interaction of a user with the virtual space by executing actions in the instance of the virtual space in response to receiving the user's input and/or any other input.

A user module may be configured to store inventories of resources that are available to users in the virtual space. The resources may include one or more wood, stone, herbs, water, ores, animals, monsters, bosses, non-player characters (NPCs), building materials, portions, and/or any other resource. The inventories may include a first inventory of resources available to a first user and/or any other user in the virtual space.

A metrics module may be configured to determine a user metric that quantifies an aspect of the first user's participation in the game. The user metric may quantify one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. The metrics module may be configured such that the user metric may be determined based on one or more of: resources in inventory, items in inventory, quests completed, alliances joined, and/or levels completed and/or other parameters.

A shop module may be configured to effectuate presentation to the users of offers to purchase resources. The offers may include a first offer for the first user to purchase a first set of one or more virtual items. The virtual items may include a virtual good, a virtual currency, and/or other virtual items. For example, the shop module may be configured such that the offers presented to the first user may be restricted to offers having prices in a first price range. The first price range may be determined based on the user metric for the first user, and/or the user metric for other users. The shop module may be configured such that the first price range may change as participation by the first user in the game causes the user metric for the first user to change. The shop module may be configured such that the first price range may be bounded by one or more both of a minimum value and/or a maximum value. The shop module may be configured such that the offers having prices below the minimum value may not be available for purchase by the first user. The shop module may be configured such that having prices above the maximum value may be locked, and/or such offers may become unlocked as the maximum value of the price range is adjusted above the prices of such offers.

A cost determination module may be configured to determine prices for the offers for the individual users based on the user metrics for the individual users. The price of the first offer for the first user may be determined based on the user metric for the first user and/or other users. The cost determination module may be configured such that the price of the first offer for a second user may be determined based on the user metric for the second user. In response to the user metric of the first user being higher than the user metric for the second user, the price of the first offer for the first user may be lower than the price of the first offer for the second user, and/or vice versa.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
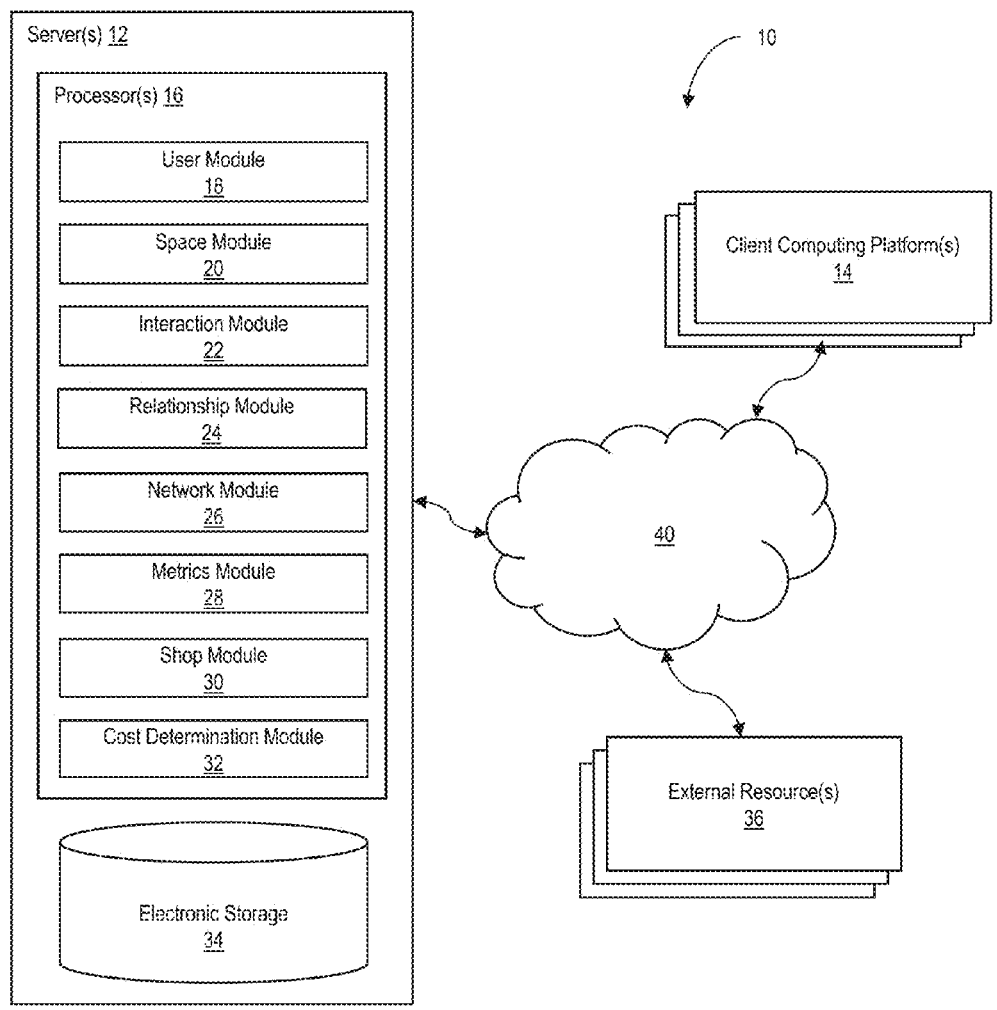
FIG. 1 illustrates an exemplary system configured to provide in-game pricing relative to player statistics in an online game, according to an aspect of the invention.

FIG. 1 illustrates a system 10 configured to facilitate providing an individualized experience that varies for users in an online game may include one or more processors configured to execute compute program modules. The program modules may comprise a user module 18, a space module 20, an interaction module 22, a relationship module 24, a network module 26, a metrics module 28, a shop module 30, a cost determination module 32 and/or any other modules. In some implementations, system 10 may include a game server 12. The game server 12 may host a game space in which an online game takes place. The game server 12 may be configured to communicate with one or more client computing platforms 14 according to a client/server architecture. The users may access system 10 and/or the virtual space via client computing platforms 14.

The game server 12 may be configured to execute one or more computer program modules. The computer program modules may include one or more of a user module 18, a space module 20, an interaction module 22, a relationship module 24, a network module 26, a metrics module 28, a shop module 30, a cost determination module 32 and/or any other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user module 18 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, portions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

A space module 20 may be configured to execute an instance of a virtual space, a space module configured to execute an instance of a virtual space and to implement the instance of the virtual space to facilitate participation by the users in an online game that takes place in the virtual space. The space module 20 may be configured to facilitate interaction of a user with the virtual space by executing actions in the instance of the virtual space in response to receiving the user's input and/or any other input.

The space module 20 may be configured to implement the instance of the virtual space executed by the computer modules to determine state of the virtual space. The state may then be communicated (e.g., via streaming visual data, via object/position data, and/or other state information) from server(s) 12 to client computing platforms 14 for presentation to users. The state determined and transmitted to a given client computing platform 14 may correspond to a view for a user character being controlled by a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 20 is not intended to be limiting. The space module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server(s) 12 (e.g., through space module 20).

The interaction module 22 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 22 in monitoring the interactions of the users may be stored to the user profiles managed by user module 18.

At a given time, interaction module 22 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 22 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 24 may be configured to establish relationships between users within the virtual space. Such relationships may include one or more of friendships, guilds (with guild-mates), alliances, connections, followers, and/or other relationships. The relationship module 24 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships of a social construct within the virtual space that does not have a functional result.

Network module 26 of the game server 12 may be configured to maintain a connection to the one or more client computing platforms 14. For example, the network module 26 may maintain one or more communication lines or ports to enable connection and/or exchange of information with a network 40 and/or other computing platforms 14. Information such as state information, game state and game logic may be communicated via network module 26. The network module may be configured to receive information from the client computing platform 14 as well.

A metrics module 28 may be configured to determine a user metric that quantifies an aspect of the first user's participation in the game. There may be one or more user metrics determined in the game. The user metric may quantify one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. The metrics module may be configured such that the user metric(s) may be determined based on one or more of: resources in inventory, items in inventory, quests completed, alliances joined, and/or levels completed and/or other parameters.

A shop module 30 may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the shop module 30 may be configured such that the offers presented to the first user may be restricted to offers having prices in a first price range. The first price range may be determined based on the user metric for the first user, and/or the user metric for other users. The shop module 30 may be configured such that the first price range may change as participation by the first user in the game causes the user metric for the first user to change. The shop module 30 may be configured such that the first price range may be bounded by one or more both of a minimum value and/or a maximum value. The shop module 30 may be configured such that the offers having prices below the minimum value may not be available for purchase by the first user. The shop module 30 may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level. The virtual items purchased may not be transferable between users, to avoid a user engaging in arbitrage.

As a player moves up to the next levels, additional goods may become available to the player for purchase. For example, as the player expands a level, they would no longer be interested in a $1,000 resource, but instead would rather purchase a $100,000 resource as the game continues to scale upward. The available goods for purchase may even be tailored based on the utility to the player.

In some implementations a short sword may initially cost $50 to a player. After the player has been playing the game for a year, the player may no longer be interested in the short sword, but instead wants the golden two-handed sword. The short sword at this point is no longer available to the player as the golden sword. Only the golden two-handed sword may now be available, and the price of this sword would alter based on the player's in-game statistics.

A cost determination module 32 may be configured to determine prices for the offers for the individual users based on the user metrics for the individual users. The price of the first offer for the first user may be determined based on the user metric for the first user and/or other users. The cost determination module 32 may be configured such that the price of the first offer for a second user may be determined based on the user metric for the second user. In response to the user metric of the first user being higher than the user metric for the second user, the price of the first offer for the first user may be lower than the price of the first offer for the second user, and/or vice versa.

In some implementations, a first player and a second player may have similar triggers, similar in-game events, and actually have different prices and currencies inside each story depending on each player's progress in the game. An individual's experience with pricing may be associated with their progress in the game, thus creating an individualized experience that could alter from character to character. Therefore, while all players may receive a message for a particular item, the cost for each player may be more or less than other players based on the individual's in-game statistics.

The game server 12, client computing platforms 14, and/or external resources 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources 36 may be operatively linked via some other communication media.

Game server 12 may include Electronic storage 34, one or more processors 16, and/or other components. Game server 12 may include communication lines, or ports to enable the exchange of information with a network 46 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 34 may comprise non-transitory storage media that electronically stores information. The electronic storage media of Electronic storage 34 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 34 may include one or more virtual storage resources (e.g., cloud storage, a virtual private network, and/or other virtual storage resources). Electronic storage 34 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, 28, 30, and/or 32. Processor 16 may be configured to execute modules 18, 20, 22, 24, 26, 28, 30, and/or 32 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28, 30, and/or 32 are illustrated in FIG. 1 as being implemented within a single processing unit, in implementations in which processor includes multiple processing units, one or more of modules 18, 20, 22, 24, 26, 28, 30, and/or 32 may be implemented remotely from the other modules. The description of the functionality provided by the different modules 18, 20, 22, 24, 26, 28, 30, and/or 32 described below is for illustrative purposes, and is not intended to be limiting, as any of modules 18, 20, 22, 24, 26, 28, 30, and/or 32 may provide more or less functionality than is described. For example, one or more of modules 18, 20, 22, 24, 26, 28, 30, and/or 32 may be eliminated, and some or all of its functionality may be provided by other ones of modules 18, 20, 22, 24, 26, 28, 30, and/or 32. As another example, processor 16 may be configured to execute one or more additional modules that may perform some or all of the functionality attributed below to one of modules 18, 20, 22, 24, 26, 28, 30, and/or 32.

A given client computing platform 14 may include one or more processors configured to execute computer program modules. The computer program modules may be configured to enable an expert or user associated with the given client computing platform 14 to interface with system 10, game server 12, and/or external resources 36, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

External resources 36 may include sources of information, hosts and/or providers of virtual spaces outside of system 10, external entities participating with system 10, and/or other resources. In some implementations, some or all of the functionality attributed herein to external resources 36 may be provided by resources included in system 10.

Figure 2:
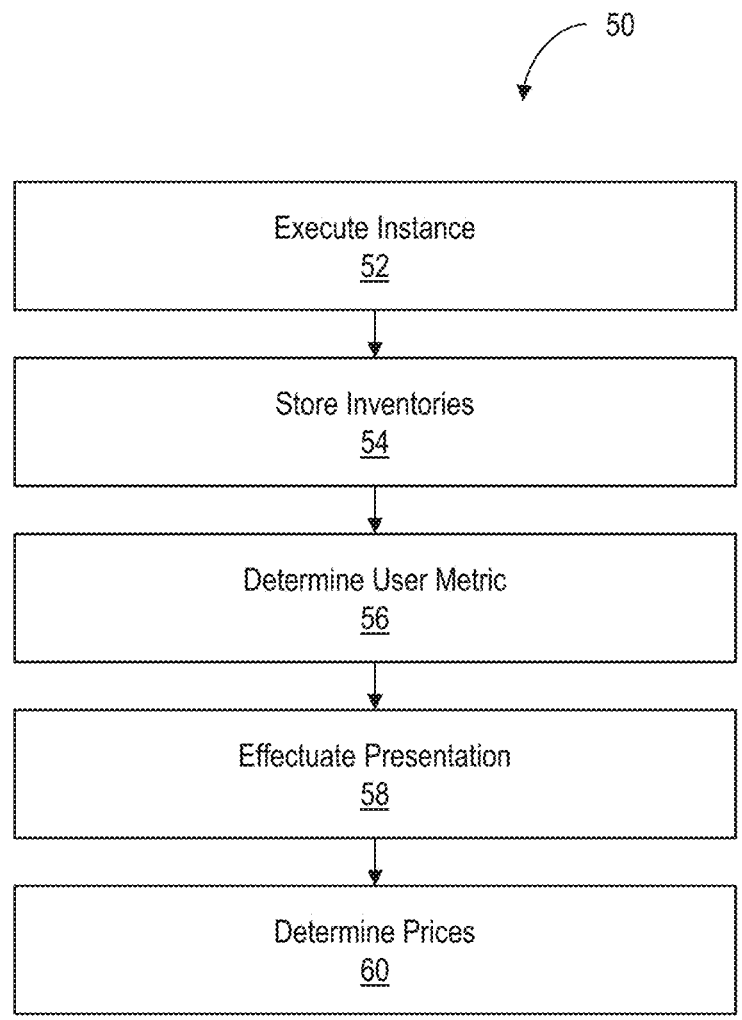
FIG. 2 illustrates an exemplary method of providing in-game pricing relative to player statistics in an online game, according to an aspect of the invention.

FIG. 2 illustrates a method 50 of providing in-game pricing relative to player statistics in an online game. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a space module the same as or similar to space module 20 (shown in FIG. 1 and described above).

At an operation 54, the executed instance of the virtual space may be implemented to store inventories. The view information may define views to be presented to users via client computing platforms. In some implementations, operation 54 may be performed by a user module the same as or similar to user module 18 (shown in FIG. 1 and described above).

At an operation 56, a user metric that quantifies an aspect of the first user's participation in the game may be determined. In some implementations, operation 56 may be performed by a metrics module the same as or similar to metrics module 28 (shown in FIG. 1 and described above).

At an operation 58, the users may be presented offers to purchase resources, the offers including a first offer for the first user to purchase a first set of one or more items. In some implementations, operation 58 may be performed by a shop module the same as or similar to shop module 30 (shown in FIG. 1 and described above).

At an operation 60, prices for the offers for the individual users based on the user metrics for the individual users such that the price of the first offer for the first user may be determined based on the user metric for the first user. In some implementations, operation 60 may be performed by cost determination module the same as or similar to cost determination module 32 (shown in FIG. 1 and described above).

Figure 3:
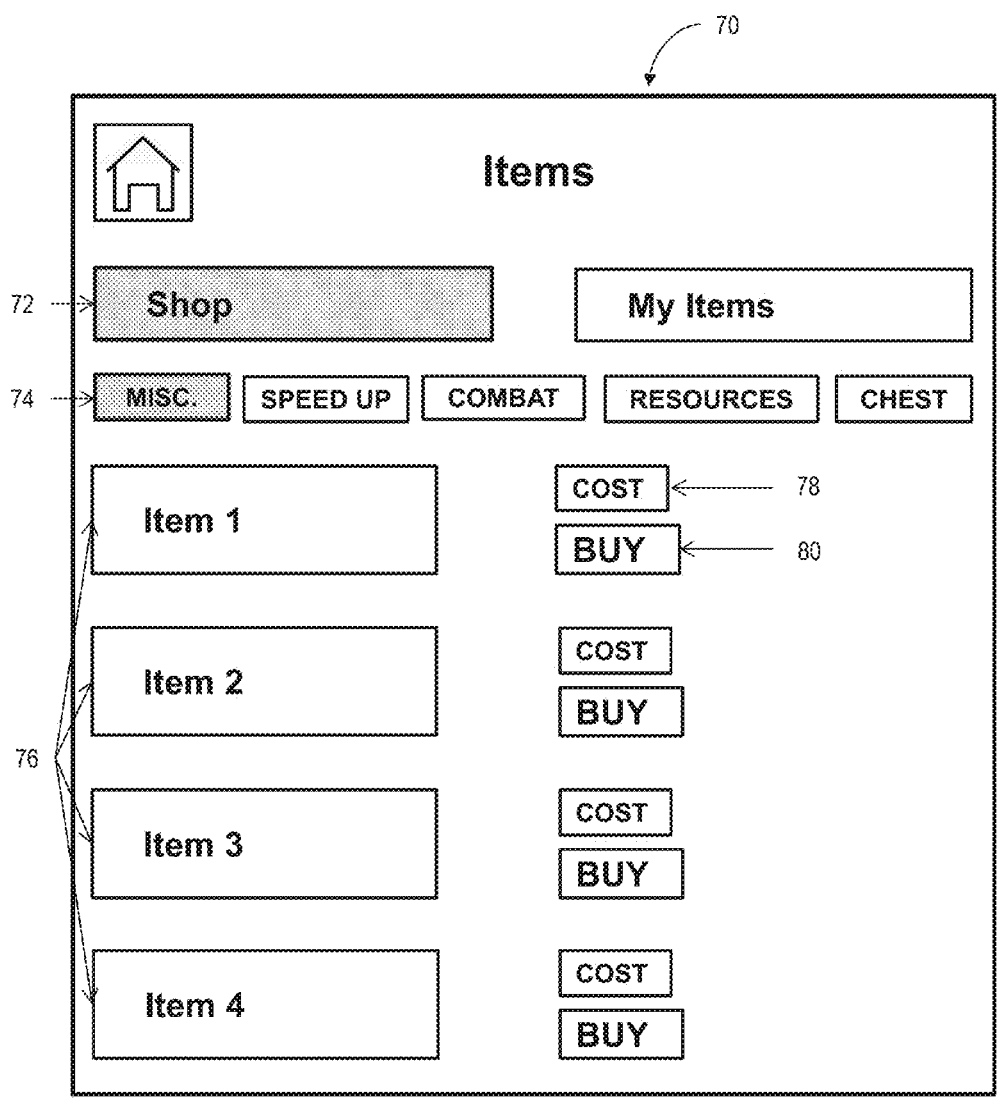
FIG. 3 illustrates an exemplary diagram of a user interface which provides in-game pricing relative to player statistics in an online game, according to an aspect of the invention.

FIG. 3 illustrates an exemplary diagram of a user interface 70 which provides in-game pricing relative to player statistics in an online game, according to an aspect of the invention. As shown, user interface 70 enables a user to purchase virtual items for in-game use. In some implementations, the user may select the shop tab 72, and select from a category 74 of virtual in-game goods to purchase. In some implementations, the categories may include one or more: miscellaneous, speed up, combat, resources, chest, and/or any other category. Each category contains lists of items 76 for a user to purchase. The user interface 70 displays the cost 78 of each item to the user, and allows purchase of the item 80. For each user, the cost 78 or each item may differ based on user metrics. For each user, a different set of items 76 may be available for purchase depending on user metrics.

Figure 4:
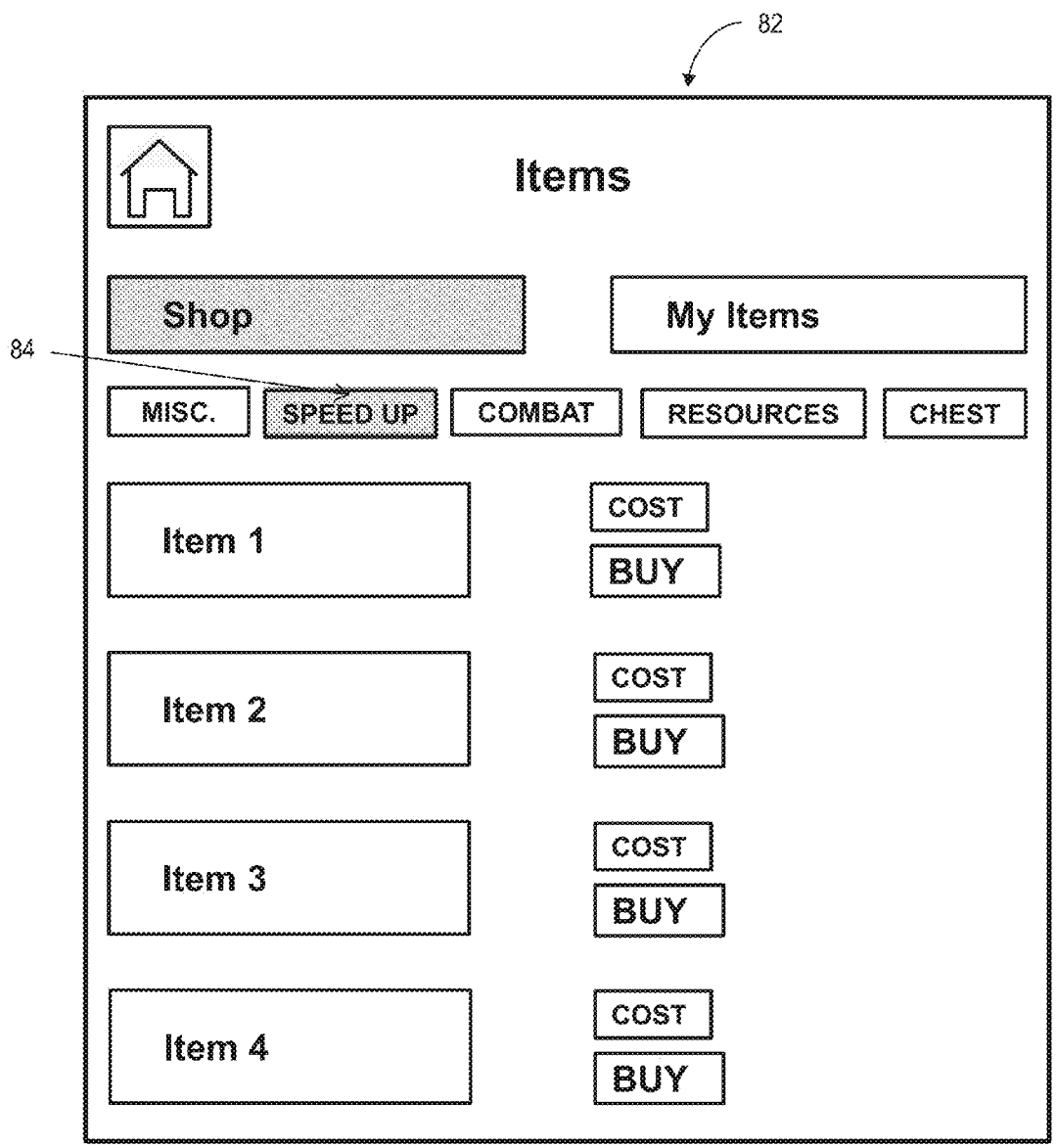
FIG. 4 illustrates an exemplary diagram of a user interface which provides in-game pricing relative to player statistics in an online game, according to an aspect of the invention.

FIG. 4 illustrates an exemplary diagram of a user interface 82 which provides in-game pricing relative to player statistics in an online game, according to an aspect of the invention. In some implementations, the user may select the shop tab 72, and select from a category 84 of virtual in-game goods to purchase.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate providing an individualized experience that varies for users, the system comprising:
one or more physical processors configured by machine-readable instructions to:
execute an instance of a virtual space, and to implement the instance of the virtual space to facilitate participation by the users in an online game that takes place in the virtual space, and to facilitate interaction of a user with the virtual space by executing actions in the instance of the virtual space in response to receiving the user's input;
store inventories of resources that are available to the users in the virtual space, the inventories including a first inventory of resources available to a first user in the virtual space;
determine a user metric that quantifies an aspect of the first user's gameplay within the online game, the user metric quantifying one or more of progress of the first user within the online game, a power level of the first user within the online game, a skill level of the first user within the online game, a level of virtual technology advancement of the first user within the online game, and/or a success of the first user within the online game;
effectuate presentation to the users of offers to purchase resources, the offers including a first offer for the first user to purchase a first set of one or more items; and
determine prices for the offers for the individual users based on the user metrics for the individual users such that the price of the first offer for the first user is determined based on the user metric for the first user; and
determine a first price range based on the user metric for the first user, wherein the offers presented to the first user are restricted to offers having prices in the first price range, the first price range being determined based on the user metric for the first user, and
wherein, responsive to the first price being in the first price range, the first offer is presented to the first user.

2. The system of claim 1, wherein the one or more physical processors are configured by machine-readable instructions such that the user metric is determined based on one or more of: resources in inventory, items in inventory, quests completed, alliances joined, or levels completed.

3. The system of claim 1, wherein the one or more physical processors are configured by machine-readable instructions such that the price of the first offer for a second user is determined based on the user metric for the second user, wherein in response to the user metric of the first user being higher than the user metric for the second user, the price of the first offer for the first user is lower than the price of the first offer for the second user.

4. The system of claim 1, wherein the one or more physical processors are configured by machine-readable instructions such that the first price range changes based on the user metric.

5. The system of claim 4, wherein the one or more physical processors are configured by machine-readable instructions such that the first price range includes a minimum value and a maximum value.

6. The system of claim 5, wherein the one or more physical processors are configured by machine-readable instructions such that the resources below the minimum value are not available to first user.

7. The system of claim 5, wherein the one or more physical processors are configured by machine-readable instructions such that the resources above the maximum value are locked and will become unlocked when the resources are within the first price range.

8. A computer implemented method for providing an individualized experience that varies for users, the method being implemented in a computer system that includes one or more physical processors configured by machine-readable instructions, the method comprising:

executing, by the one or more physical processors, an instance of a virtual space, and implementing the instance of the virtual space to facilitate participation by the users in an online game that takes place in the virtual space, wherein facilitating interaction of a user with the virtual space by executing actions in the instance of the virtual space in response to receiving the user's input;

storing, by the one or more physical processors, inventories of resources that are available to the users in the virtual space, the inventories including a first inventory of resources available to a first user in the virtual space;

determining, by the one or more physical processors, a user metric that quantifies an aspect of the first user's gameplay within the online game, the user metric quantifying one or more progress of the first user within the online game, a power level of the first user within the online game, a skill level of the first use within the online game, a level of virtual technology advancement of the first user within the online game, and/or a success of the first user within the online game;

effectuating presentation, by the one or more physical processors, to the users of offers to purchase resources, the offers including a first offer for the first user to purchase a first set of one or more items; and determining, by the one or more physical processors, prices for the offers for the individual users based on the user metrics for the individual users such that the price of the first offer for the first user is determined based on the user metric for the first user; and determining, by the one or more physical processors, a first price range based on the user metric for the first user, wherein the offers presented to the first user are restricted to offers having prices in a first price range, the first price range being determined based on the user metric for the first user, and wherein, responsive to the first price being in the first price range, the first offer is presented to the first user.

9. The method of claim 8, wherein the metric is determined based on one or more of: resources in inventory, items in inventory, quests completed, alliances joined, or levels completed.

10. The method of claim 8, wherein the price of the first offer for a second user is determined based on the user metric for the second user, wherein in response to the user metric of the first user being higher than the user metric for the second user, the price of the first offer for the first user is lower than the price of the first offer for the second user.

11. The method of claim 8, wherein to effectuate presentation to the users to purchase resources comprises displaying offers in a threshold level to the first user based on the user metric.

12. The method of claim 8, wherein the first price range changes based on the user metric.

13. The method of claim 12, wherein the first price range includes a minimum value and a maximum value.

14. The method of claim 13, wherein the resources below the minimum value are not available to first user.

15. The method of claim 13, wherein the resources above the maximum value are locked and will become unlocked when the resources are within the first price range.

* * * * *